United States Patent [19]

Müller

[11] Patent Number: 4,473,472

[45] Date of Patent: Sep. 25, 1984

[54] FILTER ELEMENT

[75] Inventor: Hans Müller, Erlenbach, Switzerland

[73] Assignee: Dr. Müller AG, Männedorf, Switzerland

[21] Appl. No.: 564,764

[22] Filed: Dec. 22, 1983

Related U.S. Application Data

[63] Continuation of Ser. No. 380,005, Jun. 1, 1982, abandoned.

[30] Foreign Application Priority Data

Nov. 4, 1981 [CH] Switzerland .......................... 7045/81
Jun. 1, 1982 [CH] Switzerland .......................... 3548/81

[51] Int. Cl.³ ............................................. B01D 29/14
[52] U.S. Cl. ................................... 210/458; 210/483
[58] Field of Search ............... 210/315, 317, 318, 354, 210/411, 457, 458, 483, 437, 438

[56] References Cited

U.S. PATENT DOCUMENTS 3,048,275  8/1962  Headrick ........................ 210/315 X
3,357,564 12/1967  Medford, Jr. et al. ......... 210/457 X
3,633,753  1/1972  Petitjean ............................ 210/356
4,225,441  9/1980  Müller ................................ 210/356

FOREIGN PATENT DOCUMENTS 727983  2/1966  Canada .............................. 210/356
1141980  1/1983  Fed. Rep. of Germany ...... 210/356

Primary Examiner—John Adee
Attorney, Agent, or Firm—Michael J. Striker

[57] ABSTRACT

Filter element for a pressure filter container, composed of a central tube surrounded by a plurality of support tubes for supporting a filter web. The support tubes can be closed or perforated. The space between the central tube and support tubes, as well as the interior in the case of perforated support tubes, serve as flow canal for the filtrate. The use of plastic tubing provides a simple and cost-favorable filter element.

8 Claims, 5 Drawing Figures

FILTER ELEMENT

This application is a continuation of application Ser. No. 380,005, filed June 1, 1982, now abandoned.

BACKGROUND OF THE INVENTION

The invention concerns a filter element, for insertion into the housing of a pressure filter.

Filter elements of this general type are known from German Auslegeschrift DE-AS No. 2 114 226. The filter tubing used therein are provided with several support bodies in the interior. The known filter element with support bodies provides an improvement in filtration characteristics. The mounting of support bodies of more complicated geometry, though, creates difficulties during cleaning of the filter elements by means of flushing-back. The construction of the inserts and the filter elements has also been more expensive and has led to an increase in cost of the filter as a whole.

SUMMARY OF THE INVENTION

It is therefore the object of the present invention to provide a filter element which is simple in construction, strong and easy to clean.

This object is attained according to the present invention by a filter element, its support body composed of a bundle of tubes, which is arranged about a central tube.

The densest packing of tubes of equal diameter is provided through arrangement of six tubes about a central tube. In addition, one can use tubes of different diameter for the central tubing. As a rule, the closed surface of the central tubing is a preferred embodiment. The support tubing maintained about the central tube displays openings about their circumference as a particularly advantageous embodiment. In connection therewith, the openings can be formed or cornered, quadratic, rectangular or polygonal. Moreover, tubing with a closed surface can be used to surround the central tube. Synthetic plastics have proven to be particularly suitable material for the tubing. The choice of specific material should be based upon the chemical characteristics of the suspension to be concentrated. Metal tubing is also suitable, the preference for plastics being mainly an economical determination.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
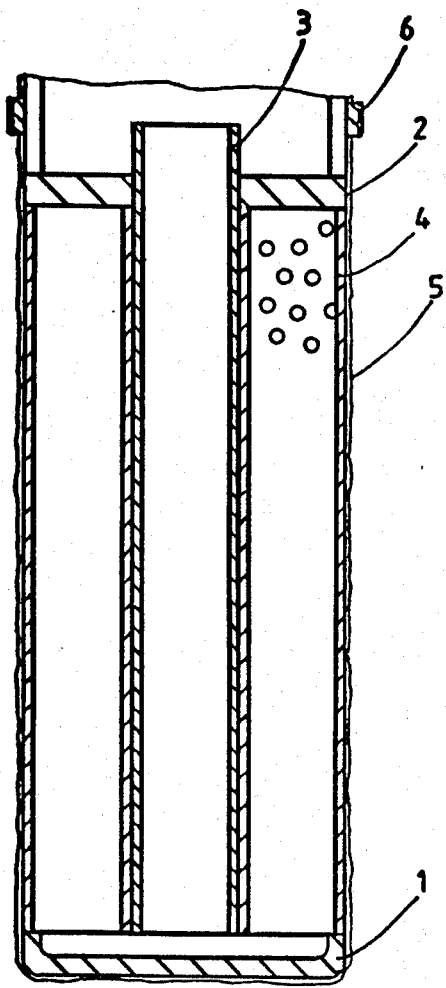
FIG. 1 is a longitudinal section through a filter element according to the present invention.
Figure 2:
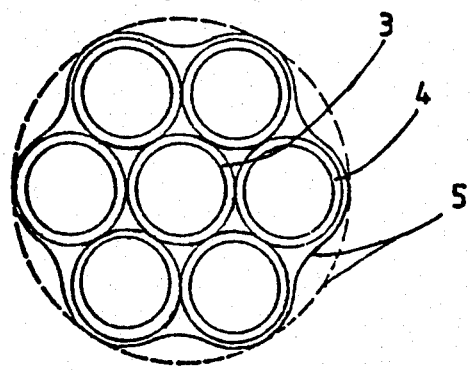
FIG. 2 is a cross-section through the filter element.
Figure 3:
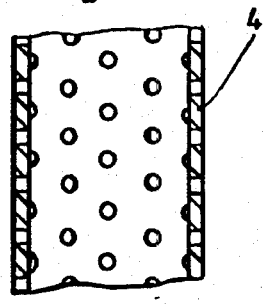
FIGS. 3, 4 and 5 show different tube openings.
Figure 4:
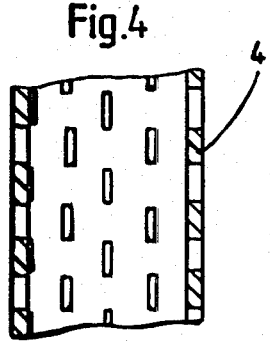
Figure 5:
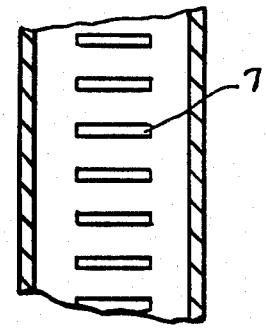

The filter element is composed of a base 1 and a lid 2. Support tubes 4 are arranged about a central tube 3, with the densest packing. The central tube 3 has a closed tube surface. The support tubes 4 can be partially perforated. A filter web 5 is put about the tube bundle to such an extent that during filtration from the outside inwardly a wave-like surface forms, and in the state of washing back a round cross-section is displayed. The filter element can be fixed with a seal 6 into the not shown mounting of a filter tank. The upper opening of tube 4 can be closed by the lid 2; alternatively, there may be an intermediate space between lid and upper edge.

A particularly advantageous refinement of the tube openings involves horizontal slits, which can be produced in simple manner by clamping the filter element upon a turning lathe. Therewith are produced uniformly horizontal openings, for which the spacings and size—or, in the case of round openings, diameters—can be adjusted as desired. Slits with an angle of 120° to the axis have proven to be particularly suitable.

The use of tubing as support elements for a filter web has the advantage that, in simple manner, the web is supported, and the filtrate can flow into the intermediate spaces. it enters at the lower part of the central tube, and leaves the tube through its upper opening into the filtrate space of the filter tank. The flow of filtrate is improved substantially by perforating the support tube.

It will be understood that each of the elements described above, or two or more together, may also find a useful application in other types of bracing differing from the types described above.

While the invention has been illustrated and described as embodied in a filter element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

I claim:

1. Filter element having a support body across which a filter web is laid, for mounting in a pressure filter container, said support body comprising
    a densely packed bundle of six tubes of equal diameter and having openings in their walls, and
    a central tube having a closed surface,
    said six tubes being axially disposed about said central tube.

2. Filter element according to claim 1, wherein said central tube and said tubes are of the same diameter.

3. Filter element according to claim 1, wherein said openings of said tubes are circular.

4. Filter element according to claim 1, wherein said openings of said tubes are rectangular.

5. Filter element according to claim 1, wherein said openings comprise vertically disposed slits.

6. Filter element according to claim 1, wherein said openings comprise horizontally disposed slits.

7. Filter element according to claim 6, wherein said slits form an angle of 120° with the axis of the support tube.

8. Filter element according to claim 1, wherein the tubes of said support body are made of synthetic material.

* * * * *